(12) United States Patent
Truong

(10) Patent No.: US 7,378,604 B2
(45) Date of Patent: May 27, 2008

(54) LUGGAGE WITH BUILT-IN WEIGHT MEASUREMENT DEVICE AND METHOD OF USE

(75) Inventor: Peter D. Truong, La Mirada, CA (US)

(73) Assignee: Ricardo Beverly Hills, La Mirada, CA (US)

( * ) Notice: Subject to any disclaimer, the term of this patent is extended or adjusted under 35 U.S.C. 154(b) by 0 days.

(21) Appl. No.: 11/599,174

(22) Filed: Nov. 13, 2006

(65) Prior Publication Data

US 2007/0107947 A1    May 17, 2007

Related U.S. Application Data

(60) Provisional application No. 60/735,341, filed on Nov. 12, 2005.

(51) Int. Cl.
*G01G 19/58* (2006.01)
*A45C 13/00* (2006.01)

(52) U.S. Cl. .............. 177/131; 177/148; 177/245; 190/115; 206/278; 224/576

(58) Field of Classification Search ............... 190/115; 177/131, 148, 149, 245; 224/576; 206/278
See application file for complete search history.

(56) References Cited

U.S. PATENT DOCUMENTS

| | | |
|---|---|---|
| 944,366 A | 12/1909 | Knapp |
| 1,197,190 A | 9/1916 | Dunn et al. |
| 1,979,978 A | 11/1934 | Martin |
| 2,069,499 A | 2/1937 | Marin et al. |
| 2,518,973 A | 8/1950 | Atherton |
| 2,710,083 A | 6/1955 | White |
| 2,759,577 A | 8/1956 | White |
| 2,937,016 A | 5/1960 | Westman |
| 3,090,454 A | 5/1963 | Farrar et al. |
| 3,321,036 A | 5/1967 | Keenan et al. |
| 3,367,431 A | 2/1968 | Baker |
| 3,572,870 A | 3/1971 | Marks et al. |
| 3,836,755 A | 9/1974 | Ehrat |
| 4,223,819 A | 9/1980 | Wright |
| 4,422,548 A | 12/1983 | Cheesman et al. |
| 4,660,666 A | 4/1987 | Reder et al. |
| 4,696,360 A | 9/1987 | Homen |
| 4,800,973 A | 1/1989 | Angel |
| 4,913,248 A | 4/1990 | Zakai |
| 4,922,922 A | 5/1990 | Pollock et al. |
| 5,031,710 A | 7/1991 | Parker et al. |
| 5,119,894 A | 6/1992 | Crawford et al. |
| 5,222,399 A | 6/1993 | Kropp |

(Continued)

FOREIGN PATENT DOCUMENTS

DE    27 21 518 B1    11/1978

(Continued)

*Primary Examiner*—Randy W Gibson
(74) *Attorney, Agent, or Firm*—Michael Best & Friedrich LLP

(57) ABSTRACT

A weight measurement module operatively coupled to a piece of luggage for determining the weight of the luggage and its contents. The weight measurement module includes one or more load cells, a processor operatively coupled to the one or more load cells, and a display operable to display the weight of the luggage and its contents.

16 Claims, 14 Drawing Sheets

U.S. PATENT DOCUMENTS

| | | |
|---|---|---|
| 5,355,980 A | 10/1994 | Hsieh |
| 5,414,225 A | 5/1995 | Garfinkle |
| 5,560,458 A | 10/1996 | Franklin et al. |
| 5,581,901 A | 12/1996 | Takahashi |
| 5,629,498 A | 5/1997 | Pollock et al. |
| 5,641,947 A | 6/1997 | Riddle, Jr. |
| 5,650,596 A | 7/1997 | Morris et al. |
| 5,714,695 A | 2/1998 | Bruns |
| 5,816,374 A | 10/1998 | Hsien |
| 5,823,278 A | 10/1998 | Geringer |
| 6,032,771 A | 3/2000 | Pedrini |
| 6,043,438 A | 3/2000 | Helberg |
| 7,084,357 B2 | 8/2006 | Roberts et al. |
| 7,271,353 B1* | 9/2007 | Lewis et al. ............. 177/131 |
| 7,281,615 B2* | 10/2007 | Siwak et al. ............. 190/39 |
| 2002/0166705 A1 | 11/2002 | Swayze |
| 2003/0127253 A1 | 7/2003 | Heyn |
| 2005/0051586 A1 | 3/2005 | Siwak et al. |
| 2005/0217903 A1 | 10/2005 | Roberts et al. |
| 2005/0217904 A1 | 10/2005 | Hughes |
| 2006/0207850 A1* | 9/2006 | Lewis |
| 2007/0007048 A1* | 1/2007 | Gill |
| 2007/0068708 A1* | 3/2007 | Marks |
| 2007/0163813 A1* | 7/2007 | Lewis |

FOREIGN PATENT DOCUMENTS

| | | |
|---|---|---|
| DE | 202 10 055 U1 | 10/2002 |
| GB | 1 308 915 | 3/1973 |
| GB | 2 385 142 A | 8/2003 |
| JP | 11-169219 | 6/1999 |
| JP | 2006-311976 * | 11/2006 |
| WO | WO 84/04027 A1 | 10/1984 |
| WO | WO 98/31250 A2 | 7/1998 |
| WO | WO 98/59223 A1 | 12/1998 |
| WO | WO 03/100360 | 12/2003 |

* cited by examiner

LUGGAGE WITH BUILT-IN WEIGHT MEASUREMENT DEVICE AND METHOD OF USE

RELATED APPLICATIONS

This application claims the benefit of U.S. Provisional Patent Application No. 60/735,341 filed on Nov. 12, 2005, titled "Luggage with Built-In Weight Measurement Device and Method of Use," the entire content of which is incorporated herein by reference.

BACKGROUND

The air travel industry has imposed weight restrictions on the weight of luggage checked by passengers with significant penalties if the luggage is overweight. Luggage cases are sometimes shaped in such a manner that does not allow the use of a scale to measure the weight of the luggage. Alternatively, a user holds the luggage and stands on a scale to weigh the luggage and its contents prior to arriving at the airport to prevent being charged for overweight luggage and/or the embarrassment of having to remove items from the luggage at the airport check-in counter.

SUMMARY

In one embodiment, the invention provides a bag comprising a plurality of side walls, a top wall connected to each of the side walls, a bottom wall connected to each of the side walls, the plurality of side walls, the top wall, and the bottom wall defining an enclosure, a handle, and a weight measurement module. The handle is coupled to the top wall, and the weight measurement module is coupled to the handle through the top wall. The weight measurement module includes a housing coupled to an interior surface of the top wall, a power source supported by the housing, a processor supported by the housing, a first load cell and a second load cell each electrically connected to the processor and mechanically coupled to the handle and the housing with a fastener, and a display coupled to the housing and an exterior surface of the top wall, the processor operable to process data received from the first load cell and the second load cell and transmit data to the display indicative of weight of the bag.

In another embodiment the invention provides a bag comprising a plurality of side walls, a top wall connected to each of the side walls, a bottom wall connected to each of the side walls, the plurality of side walls, the top wall, and the bottom wall defining an enclosure, a plurality of wheels coupled to the bottom wall, a retractable handle coupled to one of the side walls, the top wall, and the bottom wall, a handle coupled to the top wall, the handle including a first end and a second end, and a weight measurement module. The weight measurement module is coupled to an inside surface of the top wall and includes a housing having a first end and a second end, the first end of the housing coupled to the first end of the handle, the second end of the housing coupled to the second end of the handle, a beam having a first end and a second end, the first end of the. beam coupled to the first end of the handle and the first end of the housing, the second end of the beam coupled to the second end of the handle and the second end of the housing, a first strain gage connected to the beam near the first end of the beam defining a first load cell, and a second strain gage connected to the beam near the second end of the beam defining a second load cell, a processor electrically connected to the first load cell and the second load cell, the processor operable to receive data from the first load cell and the second load cell and generate a digital signal representative of the weight of the bag and items positioned in the enclosure based on the data received from the first load cell and the second load cell, a display electrically connected to the processor, the display operable to present a numerical value based on the digital signal, and a switch electrically connected to the processor, the switch operable to activate the processor to generate the digital signal when the bag is elevated from the ground.

In yet another embodiment, the invention provides a bag comprising a plurality of walls defining an enclosure, a handle coupled to one of the walls, the handle including a first end and a second end, and a weight measurement module. The weight measurement module is coupled to an inside surface of the wall in which the handle is connected and includes a housing having a first end and a second end, the first end of the housing coupled to the first end of the handle, the second end of the housing coupled to the second end of the handle, a plurality of load cells adjoined by a beam and substantially aligned with respect to one another, a processor electrically connected to the plurality of load cells, the processor operable to receive data from the plurality of load cells cell and generate a digital signal representative of the weight of the bag and items positioned in the enclosure based on the data received from the plurality of load cells, and a display electrically connected to the processor, the display operable to present a numerical value based on the digital signal.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
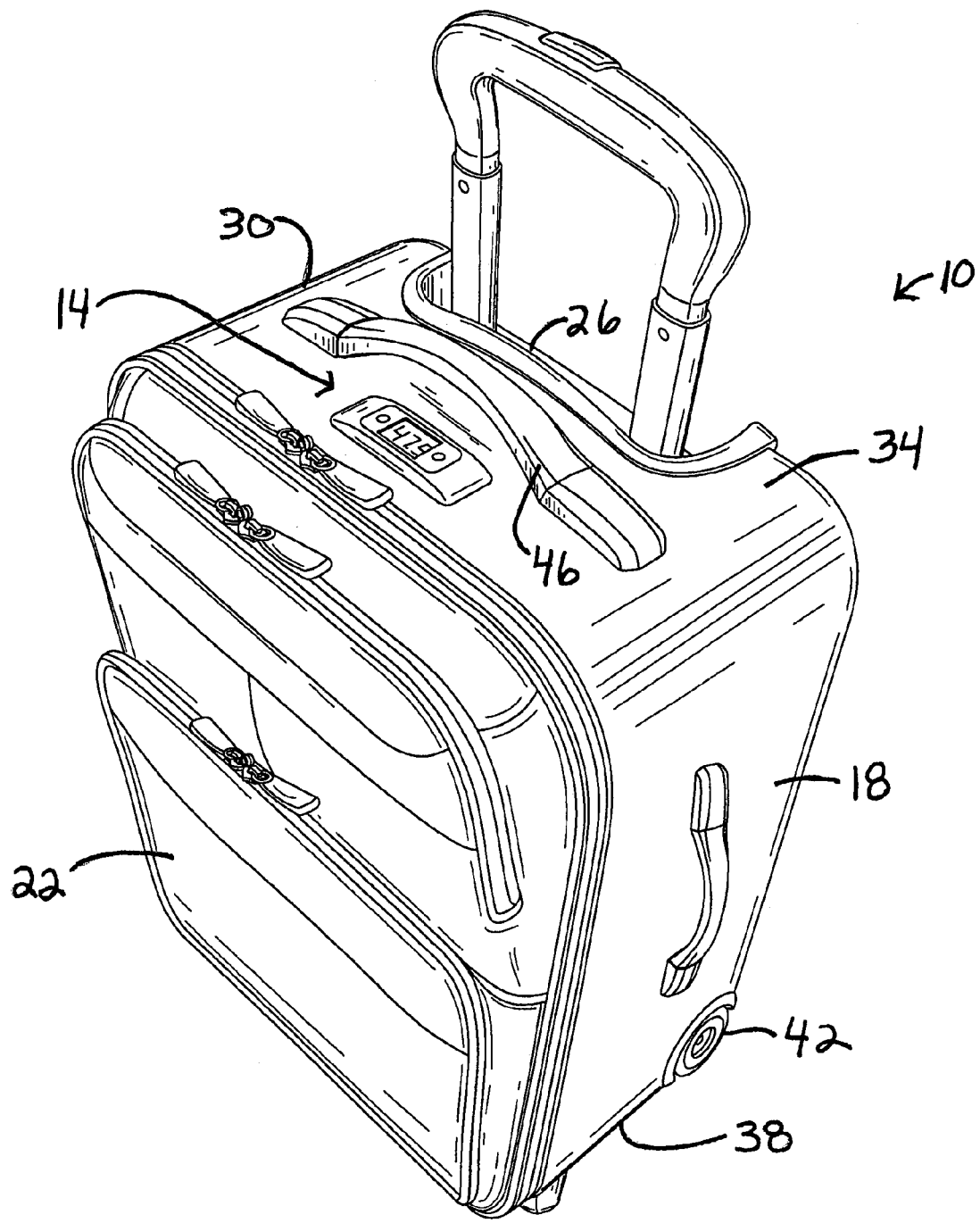
FIG. 1 is a perspective view of luggage including a weight measurement module according to one embodiment of the present invention.

FIG. 1 illustrates a piece of luggage 10 including a weight measurement module 14 according to one embodiment of the present invention. The luggage 10 includes a plurality of side walls 18, 22, 26, 30, an upper or top wall 34, and a lower or bottom wall 38. The top wall 34 is connected to each of the side walls 18, 22, 26, 30, and the bottom wall 38 is similarly connected to each of the side walls 18, 22, 26, 30 to form an enclosure for holding personal belongings and other such items. The luggage 10 illustrated in FIG. 1 includes walls 18, 22, 26, 30, 34, 38 sized to form a generally rectangular shape, however, the size of each wall may be adjusted to form luggage having other shapes, such as square, circular, trapezoidal or the like. Generally, materials such as Acrylonitrile Butadiene Styrene (ABS), polycarbonate (PC), or Polypropylene (PP) are utilized to produce Honeycomb material for the walls 18, 22, 26, 30, 34, 38. Other suitable materials may be used in combination or incorporated for the walls 18, 22, 26, 30, 34, 38. The walls 18, 22, 26, 30, 34, 38 are generally flexible, but may also be rigid.

Figure 2:
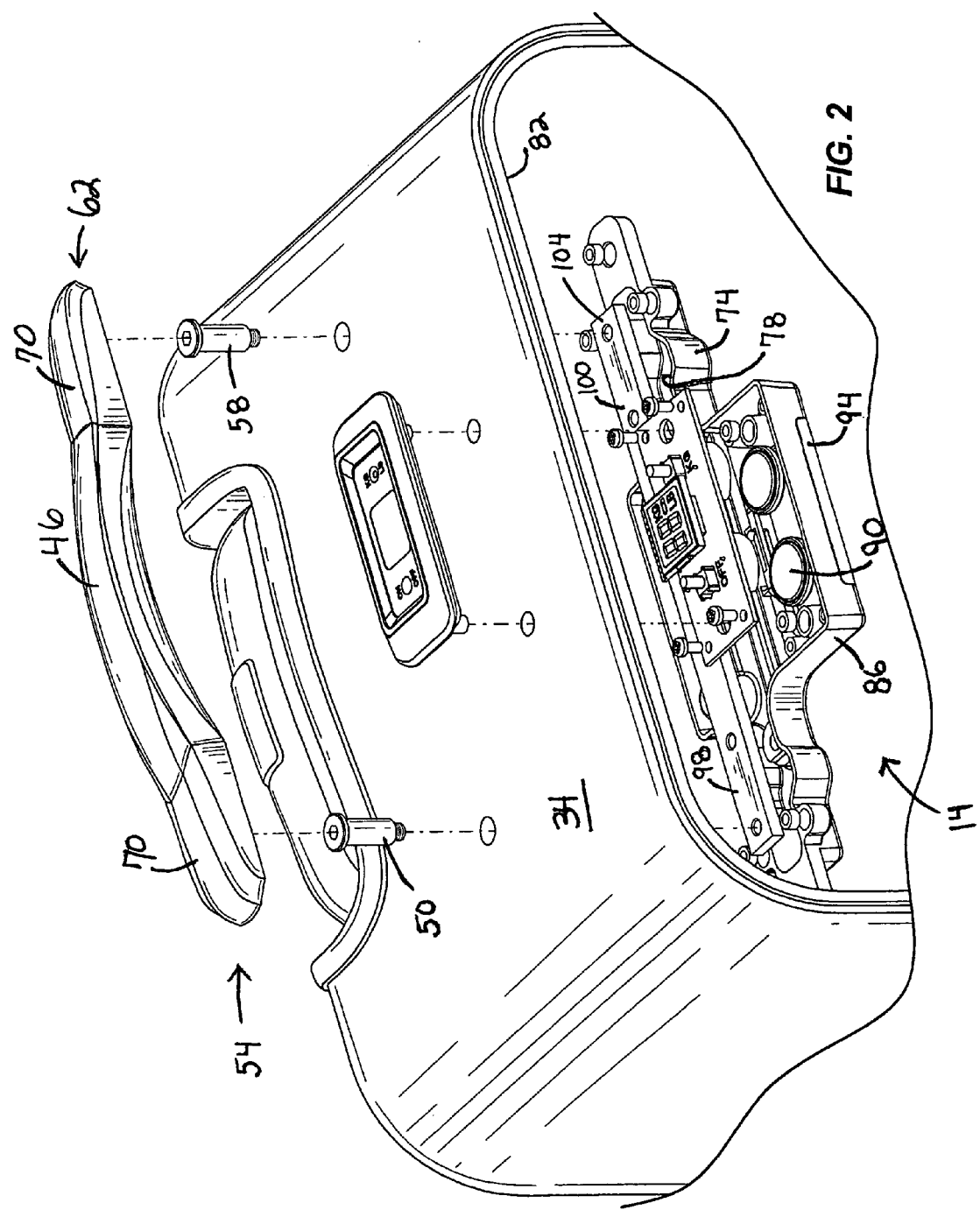
FIG. 2 is an exploded view of the luggage and the weight measurement module illustrated in FIG. 1.

The luggage 10 also includes a plurality of wheels 42 coupled to the bottom wall 38 for ease of maneuvering the luggage 10. With reference to FIG. 2, the luggage 10 also includes a handle 46 generally comprised of flexible material. The handle 46 is coupled to the weight measurement module 14 through the top wall 34 with a first fastener 50 near a first end 54 of the handle 46 and a second fastener 58 positioned near a second end 62 of the handle 46. The handle 46 includes a plurality of end caps 70, one each generally positioned at the first end 54 of the handle 46 and the second end 62 of the handle 46 to substantially cover the corresponding fasteners 50, 58.

Figure 3:
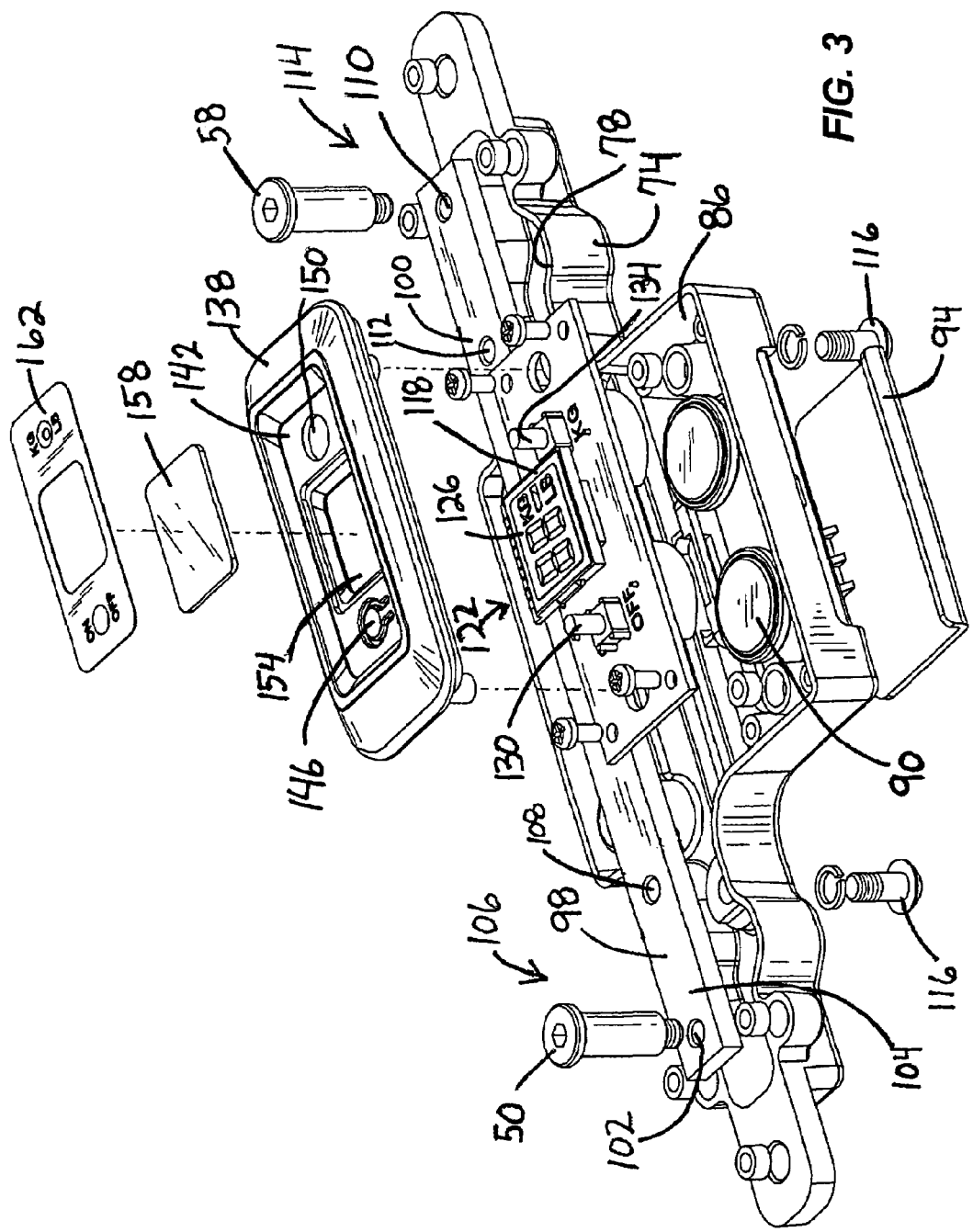
FIG. 3 is an enlarged exploded view of the weight measurement module illustrated in FIG. 1.
Figure 4:
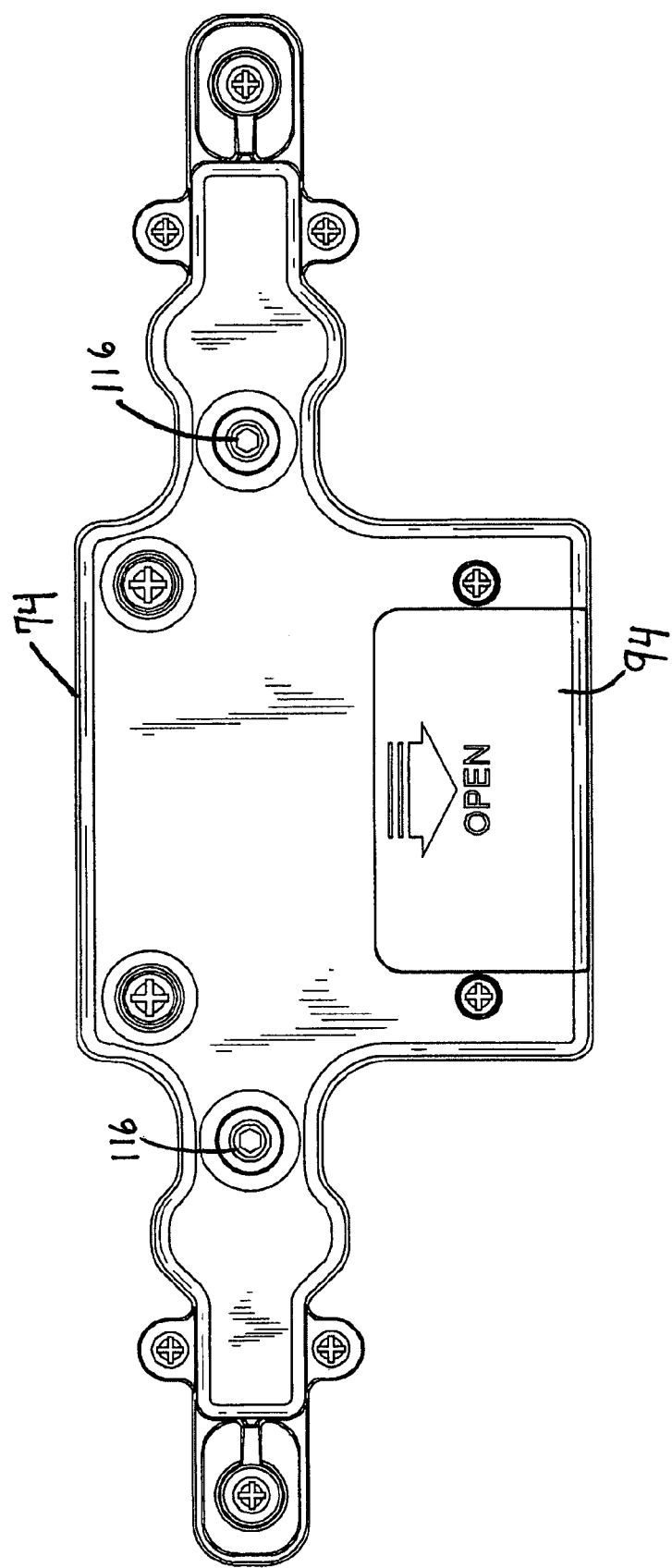
FIG. 4 is a bottom view of the weight measurement module illustrated in FIG. 1.

FIGS. 2-4 illustrate the weight measurement module 14 in more detail. The weight measurement module 14 includes a housing 74 defining a cavity 78 and adapted to be secured to an inside surface 82 of the top wall 34 by a plurality of fasteners, such as screws. The housing 74 as illustrated in FIGS. 2-3 is generally "T-shaped," but may be in the form of other suitable shapes. The housing 74 is comprised of aluminum, but may be comprised of other suitable materials or combinations of materials. The housing 74 includes a compartment 86 adapted to support a power source 90, such as one or more batteries (e.g., lithium, alkaline, etc.). The compartment 86 is enclosed with a cover 94 adapted to provide access to the power source 90.

The weight measurement module 14 also includes a first load cell 98 and a second load cell 100 that are positioned on a common beam 104, which generally extends the length of the housing 74 and is positioned within the cavity 78 of the housing 74. The beam 104 includes a first aperture 102 positioned near a first end 106 of the beam 104 and a second aperture 110 positioned near a second end 114 of the beam 104. The apertures 102, 110 are adapted to receive the fasteners 50, 58 to couple the beam 104, through the top wall 34, to the handle 46. The beam 104 also includes a third aperture 108 positioned near the first end 106 of the beam 104 and a fourth aperture 112 positioned near the second end 114 of the beam 14. The third and fourth apertures 108, 112 are adapted to receive a fastener 116, such as a screw, to couple the beam 104 to the housing 74.

The first load cell 98 is generally positioned near the first end 106 of the beam 104 and the second load cell 100 is generally positioned near the second end 114 of the beam 104. The weight measurement module 14 also includes a processor 118 operable to receive load cell data, process the data, compensate the data, and output data indicative of weight. The weight measurement module 14 also includes a display module 122 including a display 126 (e.g., a LCD) operable to receive data from the processor 118 and display a numerical value. The display module 122 also includes a switch 130 (e.g., ON/OFF pushbutton) operable to activate the weight measurement module 14. The display module 122 also includes a switch 134 operable to switch the units of measurement between kilograms (kgs) and pounds (lbs) of the measured weight. The display module 122 may include additional switches or buttons for various functional features. The display 126, the switch 130, and the switch 134 at least partially extend through the top wall 34.

The weight measurement module 14 further includes a housing 138 connected to the weight measurement module 14 through the top wall 34. The housing 138 includes a recess 142, which includes a plurality of openings 146, 150 adapted to receive the switches 130, 134, respectively. The recess 142 also includes an opening 154, which supports a panel 158 that keeps dirt and dust out of the display module 122. The housing 138 and panel 158 provide a neat appearance for the user of the luggage 10. The recess 142 supports a label 162 adapted to inform the user of the operation of the switches 130, 134.

The weight measurement module 14 operates to determine and display a numerical value representative of the weight of the luggage 10 and its contents. In operation, the user depresses the switch 130 to activate the processor 118. The user then grips the handle 46 of the luggage 10 and lifts the luggage 10 off of the ground. The combined weight of the luggage 10 and the items supported by the luggage 10 is then substantially supported by the weight measurement module 14. More specifically, as the luggage 10 exerts a force on the handle 46, the beam 104 becomes strained causing a strain gage in each of the load cells 98, 100 to change its resistance proportional to the applied load (e.g., the luggage 10 and its contents). The change in resistance of each of the strain gages generates an output voltage proportional to the load on each of the load cells 98, 100. The processor 118 can amplify, condition, combine, compensate, and convert the analog output signals to a single digital signal representative of the weight of the luggage 10 and its contents. The display module 122 presents the digital signal in the form of a numerical value representative of the weight of the luggage 10 and its contents on the display 126. The weight is displayed for a few seconds while the luggage 10 is off the ground and on the ground.

Figure 5:
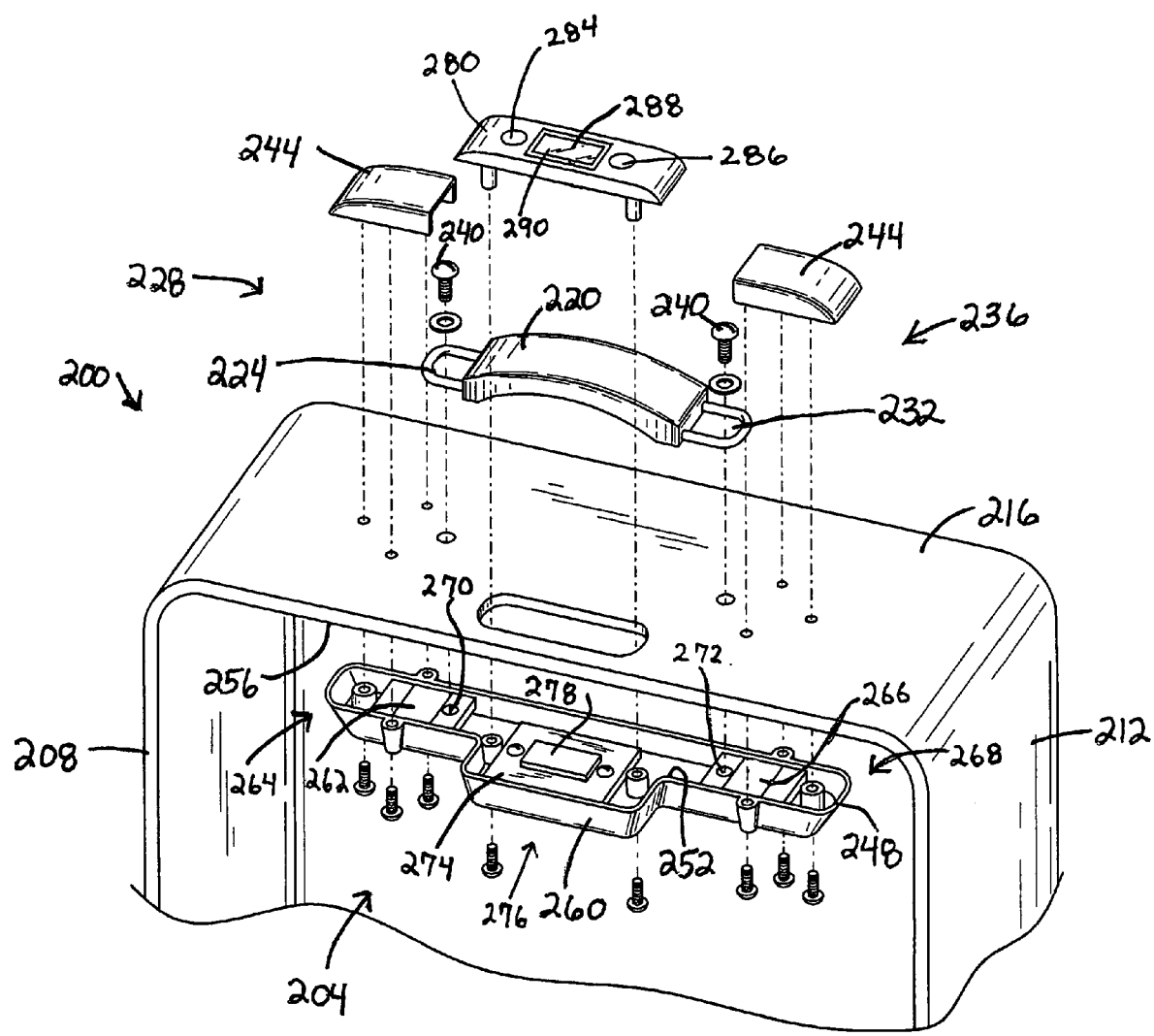
FIG. 5 is an exploded view of luggage including a weight measurement module according to one embodiment of the present invention.

FIG. 5 illustrates a piece of luggage 200 including a weight measurement module 204 according to one embodiment of the present invention. The luggage 200 includes a plurality of side walls 208, 212 (some of the side walls are not shown), an upper or top wall 216, and a lower or bottom wall (not shown). The top wall 216 is connected to each of the side walls 208, 212, and the bottom wall is similarly connected to each of the side walls 208, 212 to form an enclosure for holding personal belongings and other such items. The walls of the luggage 200 illustrated in FIG. 5 are sized to form a generally rectangular shape, however, the size of each wall may be adjusted to form luggage having other shapes, such as square, circular, trapezoidal or the like. Generally, materials such as Acrylonitrile Butadiene Styrene (ABS), polycarbonate (PC), or Polypropylene (PP) are utilized to produce Honeycomb material for the walls 208, 212, 216 as well as for the walls not shown. Other suitable materials may be used in combination or incorporated for the walls 208, 212, 216 and the walls not shown.

Although not shown, it is well known in the art that the luggage 200 can include one or more wheels coupled to the bottom wall for ease of maneuvering the luggage 200. The luggage 200 also includes a handle 220 having a first aperture 224 positioned near a first end 228 of the handle 220 and a second aperture 232 positioned near a second end 236 of the handle 220. The apertures 224, 232 are each adapted to receive a fastener 240, such as a screw. The fasteners 240 couple the handle 220 to the weight measurement module 204 through the top wall 216. The handle 220 includes a plurality of end caps 244, one each generally positioned at the first end 228 of the handle 220 and the second end 232 of the handle 220 to substantially cover the corresponding fasteners 240.

The weight measurement module 204 includes a housing 248 defining a cavity 252 and adapted to be secured to an inside surface 256 of the top wall 216 by a plurality of fasteners, such as screws. The housing 248 is comprised of aluminum, but may be comprised of other suitable materials or combinations of materials. The weight measurement module 204 includes a compartment 260 on an exterior surface of the housing 248. The compartment 260 is adapted to support a power source, such as one or more batteries (e.g., lithium, alkaline, etc.). The compartment 260 is enclosed with a cover adapted to provide access to the power source.

The weight measurement module 204 also includes a first load cell 262 positioned near a first end 264 of the housing 248 and a second load cell 266 positioned near a second end 268 of the housing 248. Both of the load cells 262, 266 are positioned within the cavity 252 of the housing 248. The first load cell 262 includes an aperture 270 and the second load cell 266 includes an aperture 272. The apertures 270, 272 are adapted to receive the fasteners 240 to couple the load cells 262, 266, through the top wall 216, to the handle 220. The load cells 262, 266 each also include apertures positioned near a distal end of the load cells 262, 266 and are adapted to receive a fastener, such as a screw, to couple the load cells 262, 266 to the housing 248. The weight measurement module 204 also includes a processor 274 operable to receive data from both of the load cells 262, 266, process the data, and output data indicative of weight. The weight measurement module 204 also includes a display module 276 including a display 278 (e.g., a LCD) operable to receive data from the processor 274 and display a numerical value. The display module 276 can also include a first switch (e.g., ON/OFF pushbutton) operable to activate the weight measurement module 204 and a second switch operable to switch the units of measurement between kilograms (kgs) and pounds (lbs) of the measured weight. The display module 276 may include additional switches or buttons for various functional features. The display 278 and the switches at least partially extend through the top wall 216.

The weight measurement module 204 further includes a housing 280 connected to the weight measurement module 204 through the top wall 216. The housing 280 includes a plurality of openings 284, 286 adapted to receive the switches. The housing 280 also includes an opening 288, which supports a panel 290 that keeps dirt and dust out of the display module 276. The housing 280 and panel 290 provide a neat appearance for the user of the luggage 200. The housing 280 supports a label adapted to inform the user of the operation of the switches.

The weight measurement module 204 operates to determine and display a numerical value representative of the weight of the luggage 200 and its contents. In operation, the user depresses a switch to activate the processor 274. The user then grips the handle 220 of the luggage 200 and lifts the luggage 200 off of the ground. The combined weight of the luggage 200 and the items supported by the luggage 200 is then substantially supported by the weight measurement module 204. More specifically, as the luggage 200 exerts a force on the handle 220, the load cells 262, 266 become strained causing a strain gage positioned on each of the load cells 262, 266 to change its resistance proportional to the applied load (e.g., the luggage 200 and its contents). The change in resistance of the strain gages generates an output voltage proportional to the load on each of the load cells 262, 266. The processor 276 can combine, amplify, condition, compensate, and convert each of the analog output signals to a digital signal representative of the weight of the luggage 200 and its contents. The display module 276 presents the digital signal in the form of a numerical value representative of the weight of the luggage 200 and its contents on the display 278. The weight is displayed for a few seconds while the luggage 200 is off the ground and on the ground.

FIGS. 6-12 illustrate additional embodiments of a weight measurement module that can be incorporated in various kinds of luggage or bags. The weight measurement modules can be incorporated in any size luggage or bag.

Figure 6:
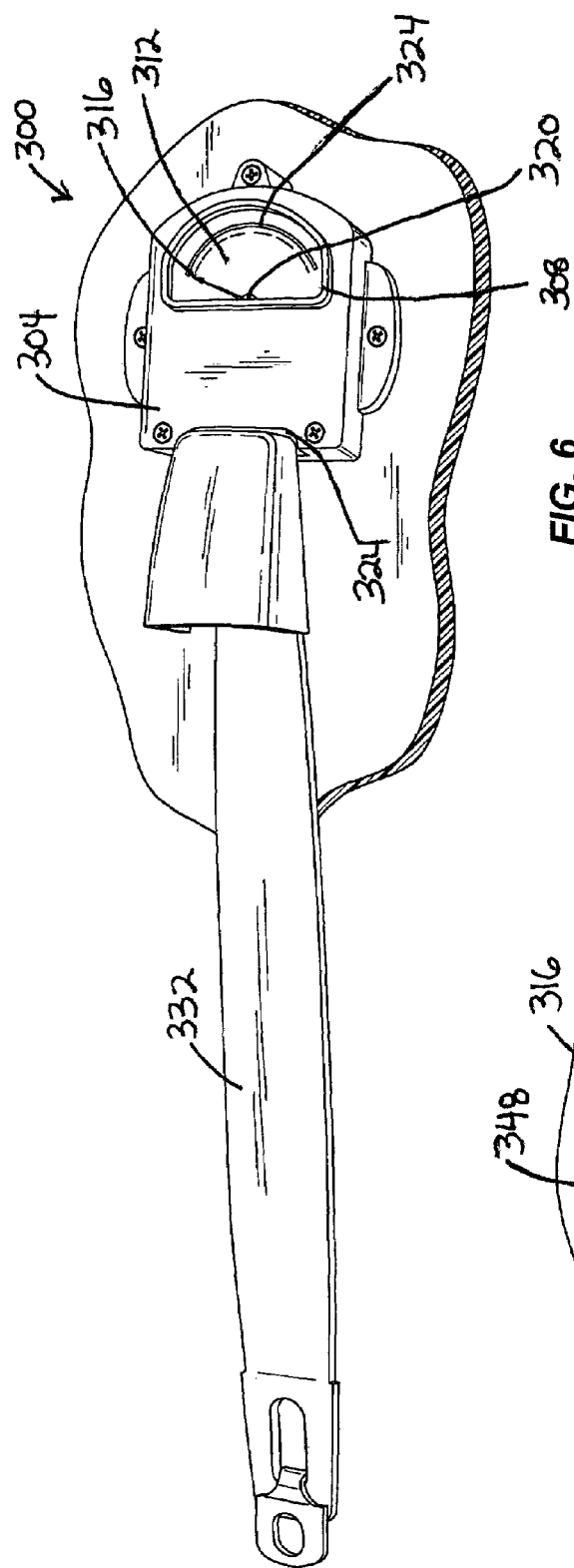
FIG. 6 is a perspective view of a weight measurement module according to one embodiment of the present invention.

As illustrated in FIG. 6, a weight measurement module 300 can be incorporated in at least one wall of a piece of luggage. The weight measurement module 300 includes a housing 304 and a display module 308 operable to display the weight of the luggage and its contents. The display module 308 includes a symbol plate 312 and an indicator 316 adapted to rotate or pivot about a point 320 and to point at a symbol 324 on the symbol plate 312, generally indicative of the weight of the luggage and its contents. The housing 304 includes a recess 324 adapted to receive a removable end cap 328 coupled to a handle 332. The weight measurement module 300 includes a spring coupled to the handle 332 and the indicator 316

The weight measurement module 300 operates to indicate the weight of the luggage and its contents. In operation, the user grips the handle 332 of the luggage and lifts the luggage off of the ground. The combined weight of the luggage and the items supported by the luggage is then substantially supported by the weight measurement module 300. More specifically, as the luggage exerts a force on the handle and the weight measurement module 300, the spring exerts a force on the indicator 316 to pivot about the point 320 to indicate the weight of the luggage and its contents.

Figure 7:
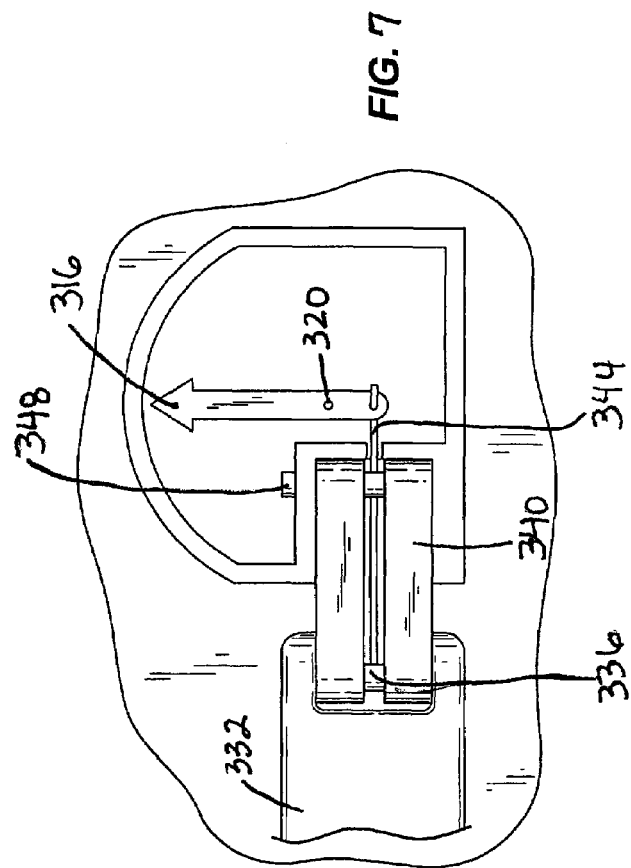
FIG. 7 is a top view of a weight measurement module according to one embodiment of the present invention.

FIG. 7 illustrates an alternative construction of the weight measurement module 300. In this construction, the handle 332 supports a first shaft 336. The first shaft 336 extends along the width of the handle 332 and supports a plurality of bands 340 and a link 344. The link 344 is connected to the indicator 316 and is adapted to rotate or pivot about the pivot point 320. Other embodiments can include a single band or multiple bands. The housing 304 supports a second shaft 348, which supports the plurality of bands 340.

The weight measurement module 300, based on the construction illustrated in FIG. 7, operates to indicate the weight of the luggage and its contents. In operation, the user grips the handle 332 of the luggage and lifts the luggage off of the ground. The combined weight of the luggage and the items supported by the luggage is then substantially supported by the weight measurement module 300. More specifically, as the luggage exerts a force on the handle and the weight measurement module 300, the bands 340 stretch as the first shaft 336 moves with the bands 340. The link 344 also moves with the shaft 336 an amount or length substantially proportional to the weight of the luggage and its contents. The indicator 316, which is connected to the link 344, also moves as a result of the link 344 exerting a sufficient force on the indicator 316 causing the indicator 316 to pivot about the point 320.

Figure 8:
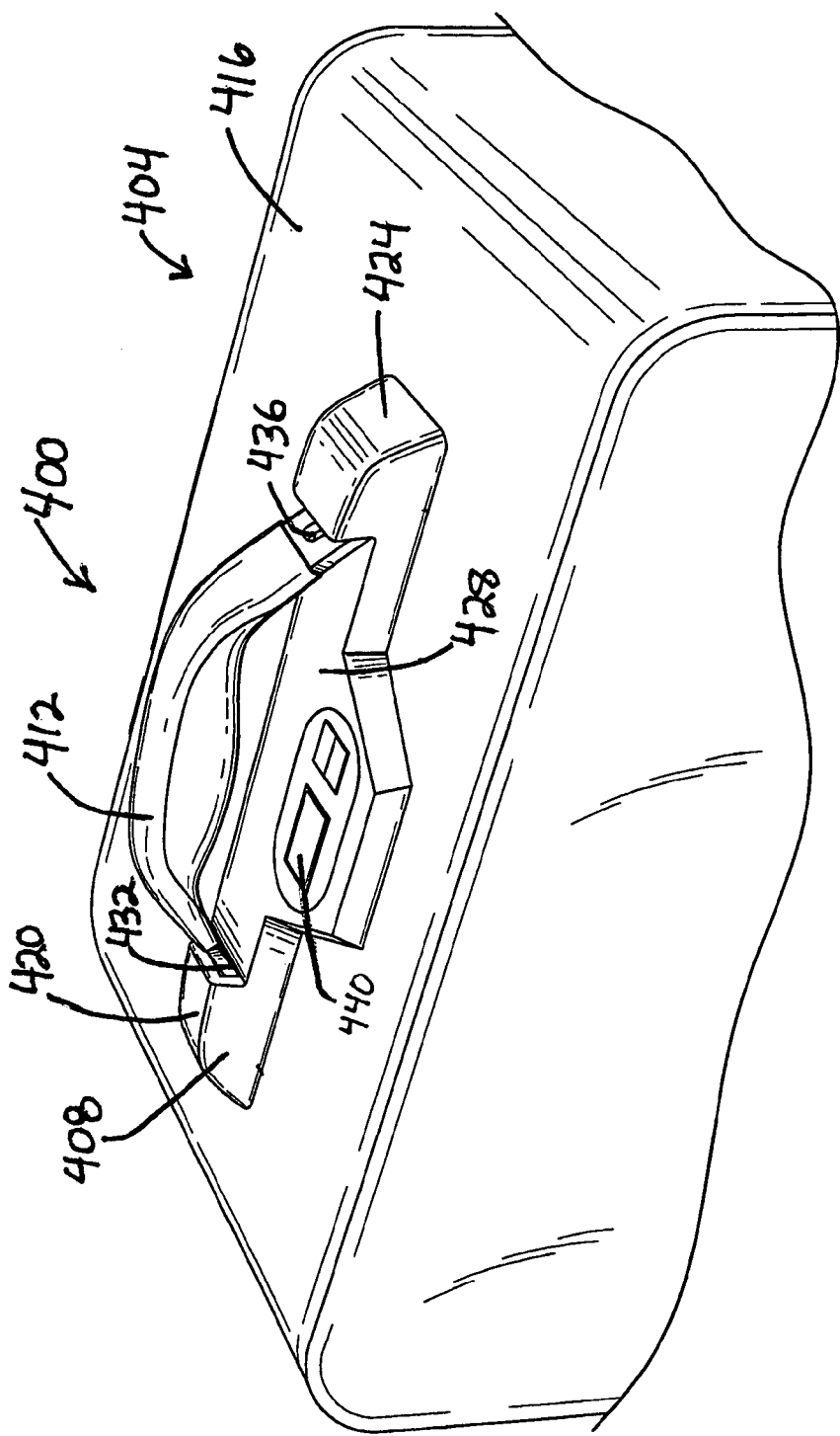
FIG. 8 is a perspective view of a weight measurement module according to one embodiment of the present invention.

FIG. 8 illustrates another embodiment of a weight measurement module 400 operable to provide an indication of weight of a piece of luggage 404. The weight measurement module 400 includes a housing 408 and a handle 412 coupled to the housing 408. The housing 408 is coupled to an outer surface 416 of the luggage 404. The housing 408 is generally "T-shaped," as illustrated in FIG. 8, however, the housing 408 may also encompass other suitable shapes.

The housing 408 includes a first end 420, a second end 424, and a center section 428 positioned between the first end 420 and the second end 424. The handle 412 includes a first aperture 432 near the first end 420 and a second aperture 436 near the second end 424. The apertures 432, 436 are adapted to receive a fastener, such as a screw, to secure the handle 412 to the housing 408 and one or more load cells. The center section 428 supports a display 440 that is visible from the exterior of the luggage 404. The center section 428 also supports an electronic assembly, such as a processor, operable to receive electronic signals from one or more load cells (not shown) located within the housing 408. The load cell(s) may function similar to the load cells described above with respect to the two load cell embodiment.

In operation, the user grips the handle 412 of the luggage 404 and lifts the luggage 404 off of the ground. The combined weight of the luggage 404 and the items supported by the luggage 404 is then substantially supported by the weight measurement module 400. More specifically, as the luggage 404 exerts a force on the handle 412, which in turn exerts a force on the load cells, the electronic assembly receives an electronic signal generated by the load cells, processes the electronic signal to a numerical value indicative of the weight of the luggage 404 and its contents. The display 440 presents the numerical value to the user.

Figure 9:
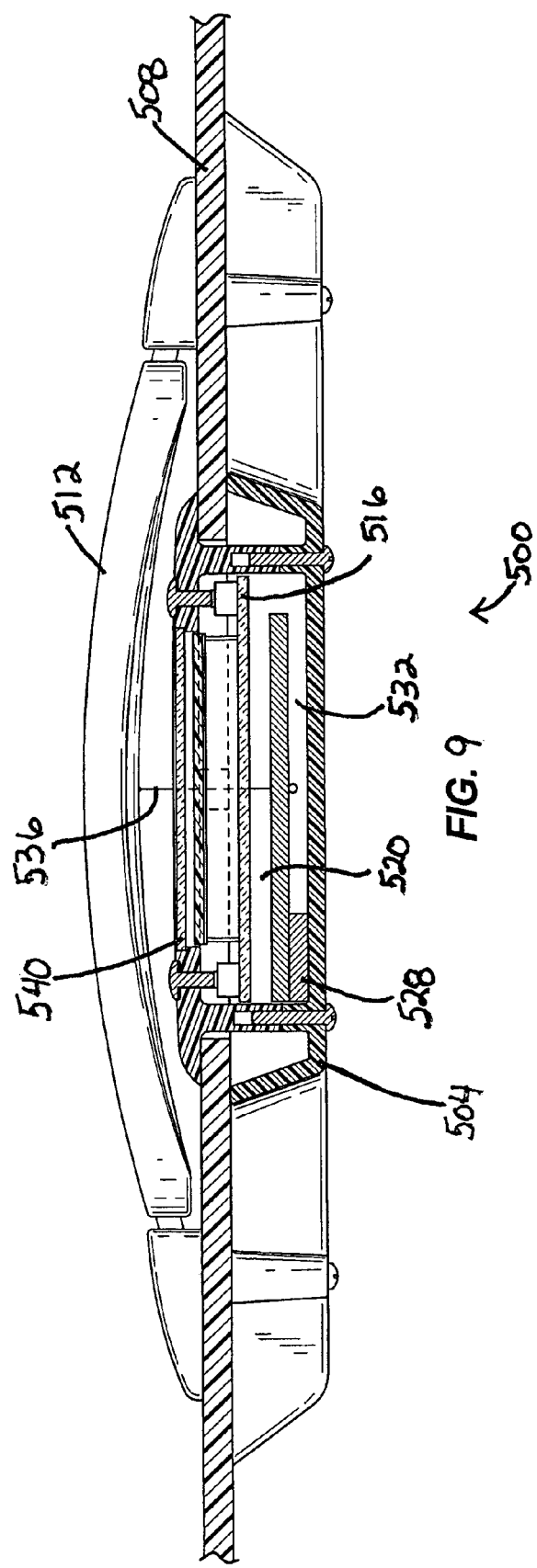
FIG. 9 is a side cross-sectional view of a weight measurement module according to one embodiment of the present invention.

FIG. 9 illustrates a cross-sectional view of another embodiment of a weight measurement module 500 operable to provide an indication of weight of a piece of luggage. The weight measurement module 500 includes a housing 504 coupled to a wall 508 of the luggage. A handle 512 is coupled to the wall 508 of the luggage. The weight measurement module 500 includes an electronic assembly 516 and a load cell 520 electrically connected to the electronic assembly 516. The electronic assembly 516 is coupled to the wall 508 of the luggage with a plurality of fasteners, such as screws. The space between the electronic assembly 516 and the load cell 520 defines a first separation space 524. The load cell 520 is coupled to the housing 504 with a spacer 528. The spacer 528 is coupled to one end of the load cell 520 to define a second separation space 532 between a portion of the load cell 520 and the housing 504. The weight measurement module 500 also includes a cable 536 coupled to the load cell 520 and the handle 512 through the wall 508. The weight measurement module 500 further includes a display 540 coupled to the housing 504 and operable to display a numerical value representative of the weight of the luggage and its contents.

In operation, the user grips the handle 512 of the luggage and lifts the luggage off of the ground. The combined weight of the luggage and the items supported by the luggage is then substantially supported by the weight measurement module 500. More specifically, as the luggage exerts a force on the handle 512 and the weight measurement module 500, the cable 536 exerts a force on the load cell 532. The load cell 532 bends and generates an electronic signal proportional to the amount of bending. The electronic assembly 516 receives the electronic signal generated by the load cell 520, processes the electronic signal to a numerical value indicative of the weight of the luggage and its contents. The display 540 presents the numerical value to the user.

Figure 10:
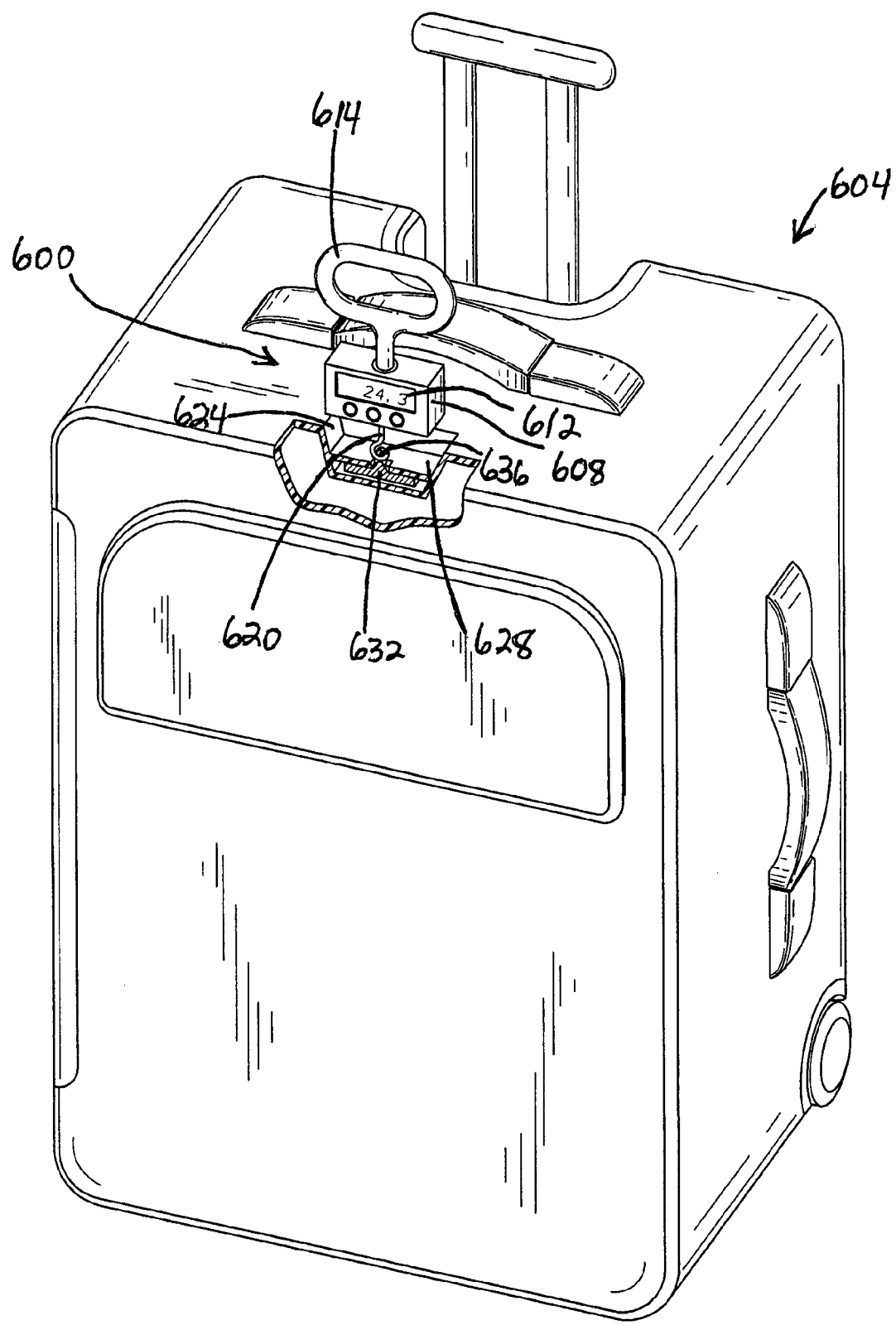
FIG. 10 is a perspective view of luggage including a weight measurement module according to one embodiment of the present invention.

FIG. 10 illustrates another embodiment of a weight measurement module 600 operable to provide an indication of weight of a piece of luggage 604. The weight measurement module 600 includes a housing 608, a display 612 coupled to the housing, and a handle 616 coupled to the housing 608. The weight measurement module 600 is releasably coupled to the luggage 604.

The weight measurement module 600 includes a cable 620 connectable to the luggage 604 when a user desires to determine the weight of the luggage 604 and its contents. The luggage 604 includes a recessed portion 624 having a wall 628 with a plate 632 embedded therein. The plate 632 include a protrusion 636 adapted to extend through the wall 628 of the luggage 604 for ease of connecting the weight measurement module 600.

In operation, the user connects the weight measurement module 600 to the protrusion 636 on the plate 632 and lifts the luggage 604 off the ground with the handle 614. The weight measurement module 600 measures the weight of the luggage 604 and its contents and displays a numerical value representative of the weight of the luggage 604 and its contents on the display 612.

Figure 11A:
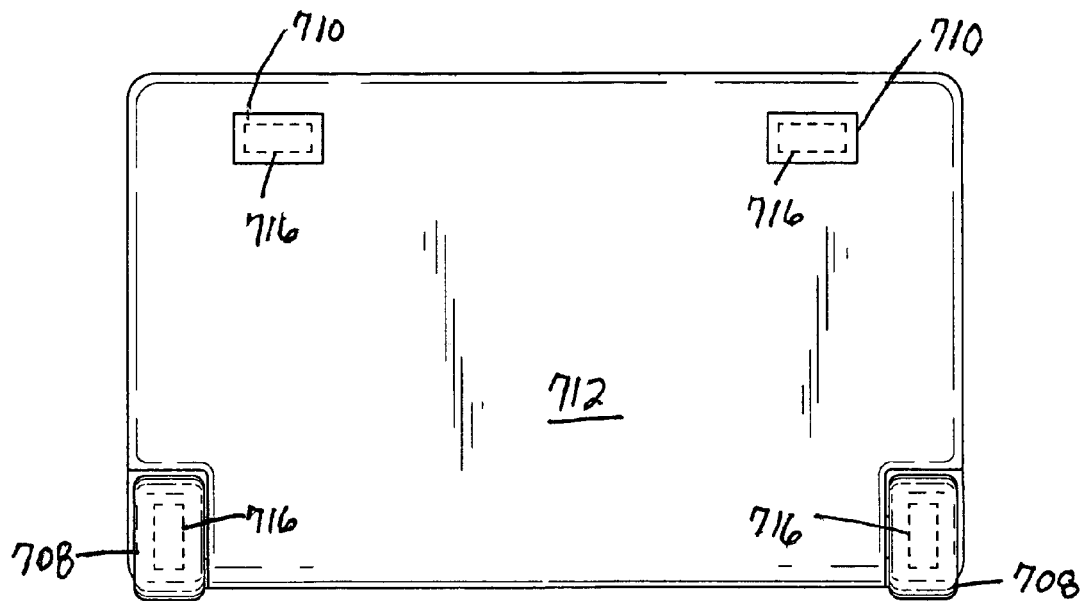
FIG. 11A is a bottom view of luggage including a weight measurement module according to one embodiment of the present invention.
Figure 11B:
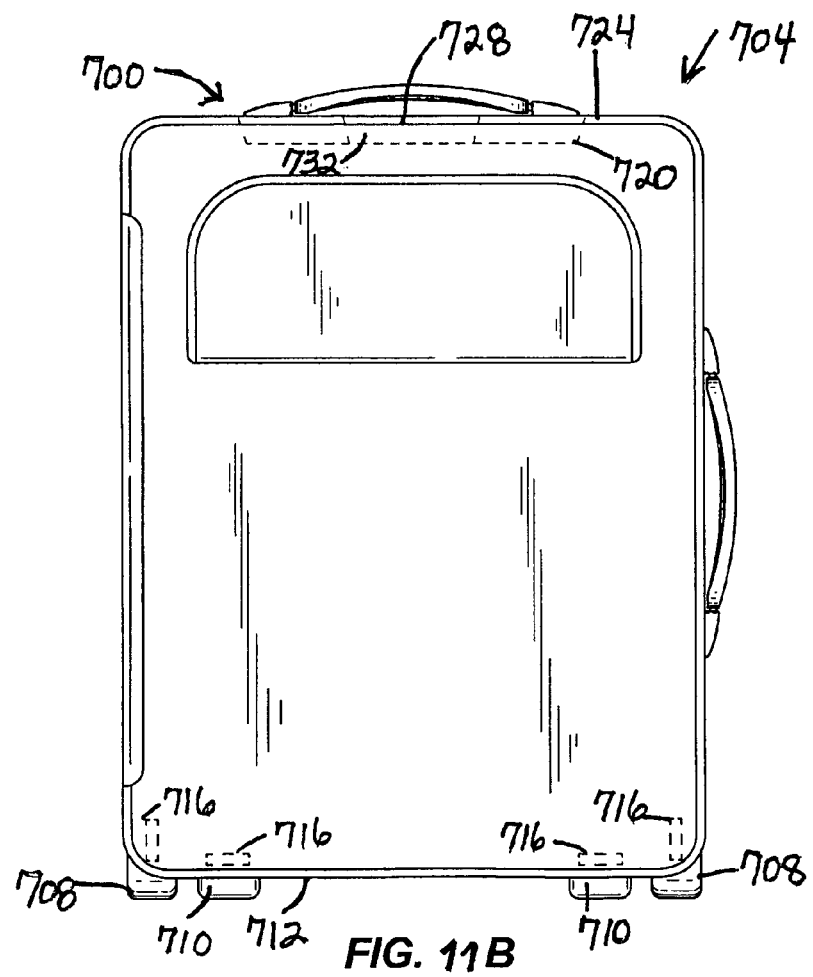
FIG. 11B is a front view of the luggage with the weight measurement module illustrated in FIG. 11A.

FIGS. 11A-11B illustrate another embodiment of a weight measurement module 700 operable to provide an indication of weight of a piece of luggage 704. The luggage 704 includes a plurality of wheels 708 and feet 710 coupled to a bottom wall 712 of the luggage 704. The weight measurement module 700 includes a plurality of load cells 716 each coupled to an inside surface of the bottom wall 712 and adjacent to each of the wheels 708 and the feet 710. The weight measurement module 700 also includes a housing 720 coupled to an inside surface of an upper wall 724 of the luggage 704 and a display 728 coupled to the housing 720 and extending through the upper wall 724. The housing 720 supports a processor 732 operable to receive data from each of the load cells 716, process the data, and output data indicative of weight. Each of the load cells 716 is electrically connected to the processor 732.

The weight measurement module 700 operates to determine and display a numerical value representative of the weight of the luggage 704 and its contents. In operation, the user depresses a switch to activate the processor 732. The user then positions the luggage 704 such that the wheels 708 and feet 710 are on the ground. The weight of the luggage 704 and the items supported by the luggage 704 is then substantially supported by the plurality of load cells 716. More specifically, as the luggage 704 exerts a force on the load cells 716, the load cells 716 become strained causing a strain gage positioned on each of the load cells 716 to change its resistance proportional to the applied load (e.g., the luggage 704 and its contents). The change in resistance of the strain gages generates an output voltage proportional to the load on each of the load cells 716. The processor 732 can combine, amplify, condition, and convert each of the analog output signals to a digital signal representative of the weight of the luggage 704 and its contents. The display 728 presents the digital signal in the form of a numerical value representative of the weight of the luggage 704 and its contents. The weight is displayed for a few seconds.

Figure 12:
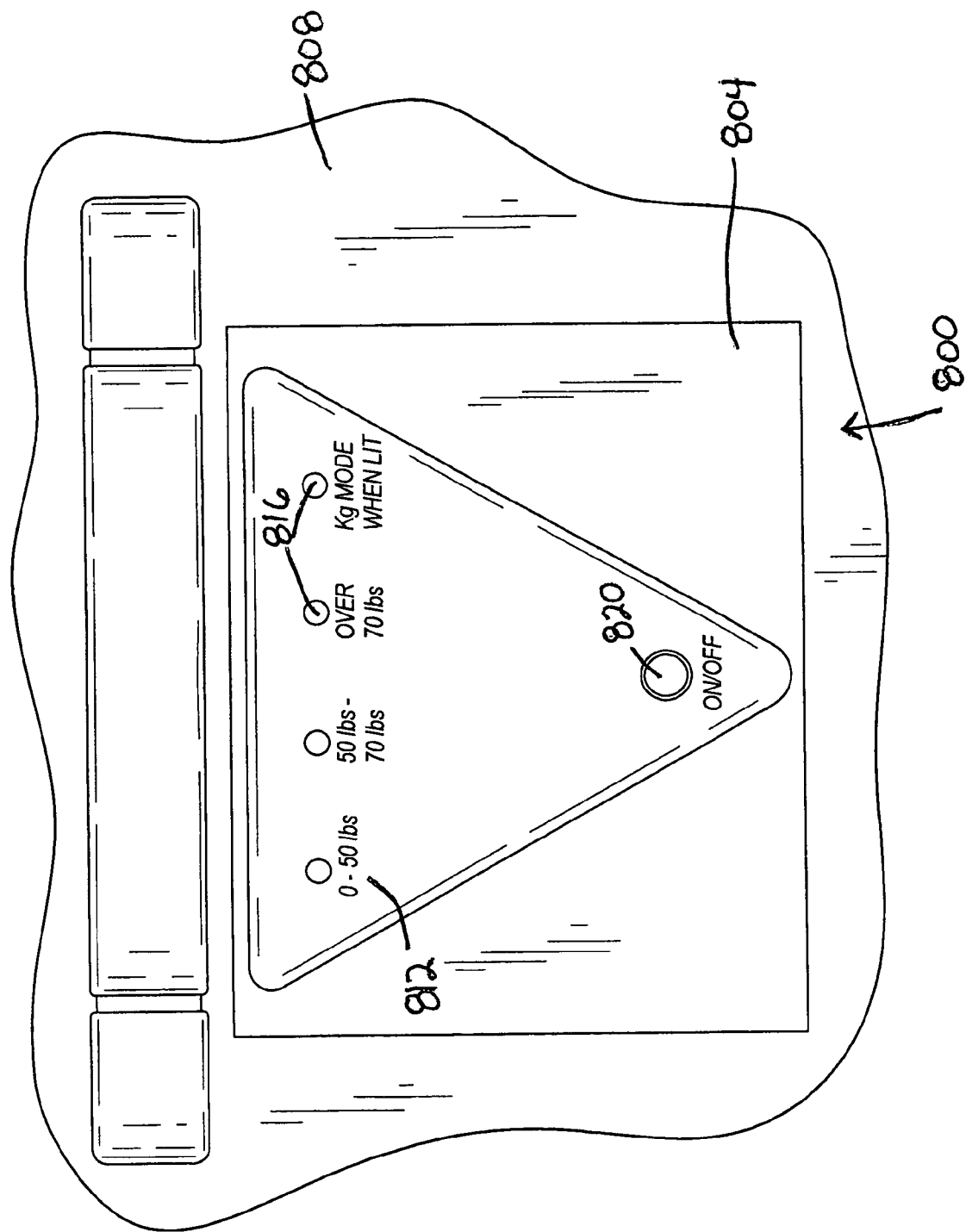
FIG. 12 is top view of a display module according to one embodiment of the present invention.

FIG. 12 illustrates an alternative construction for the display module of any of the above-described weight measurement module embodiments. In this construction, the display module 800 includes a display 804 is coupled to a wall 808 of a piece of luggage and generally adjacent or near to the handle. Accordingly, the wall 808 and necessary apertures in the wall 808 can be adapted to accommodate the display 804. The display module 800 includes an interface or symbol plate 812 having a plurality of indicators. The display module 800 includes a plurality of light emitting diodes (LED) 816 and a switch 820 operable to activate the display 804 and/or weight measurement module as described above. Each LED 816 corresponds to a range of values generally encompassing the weight of the luggage and its contents. For example, the display 804 includes a first LED, a second LED, and a third LED. The first LED corresponds to a weight range of 0-50 lbs., the second LED corresponds to a weight range of 50-70 lbs., and the third LED corresponds to a weight range of 70 lbs. and more. A fourth LED indicates when the ranges corresponding to the first, second, and third LEDs are in kilogram (kg) units instead of pounds (lbs) units. More, fewer, and/or different weight ranges may be used than those illustrated in FIG. 12.

Figure 13:
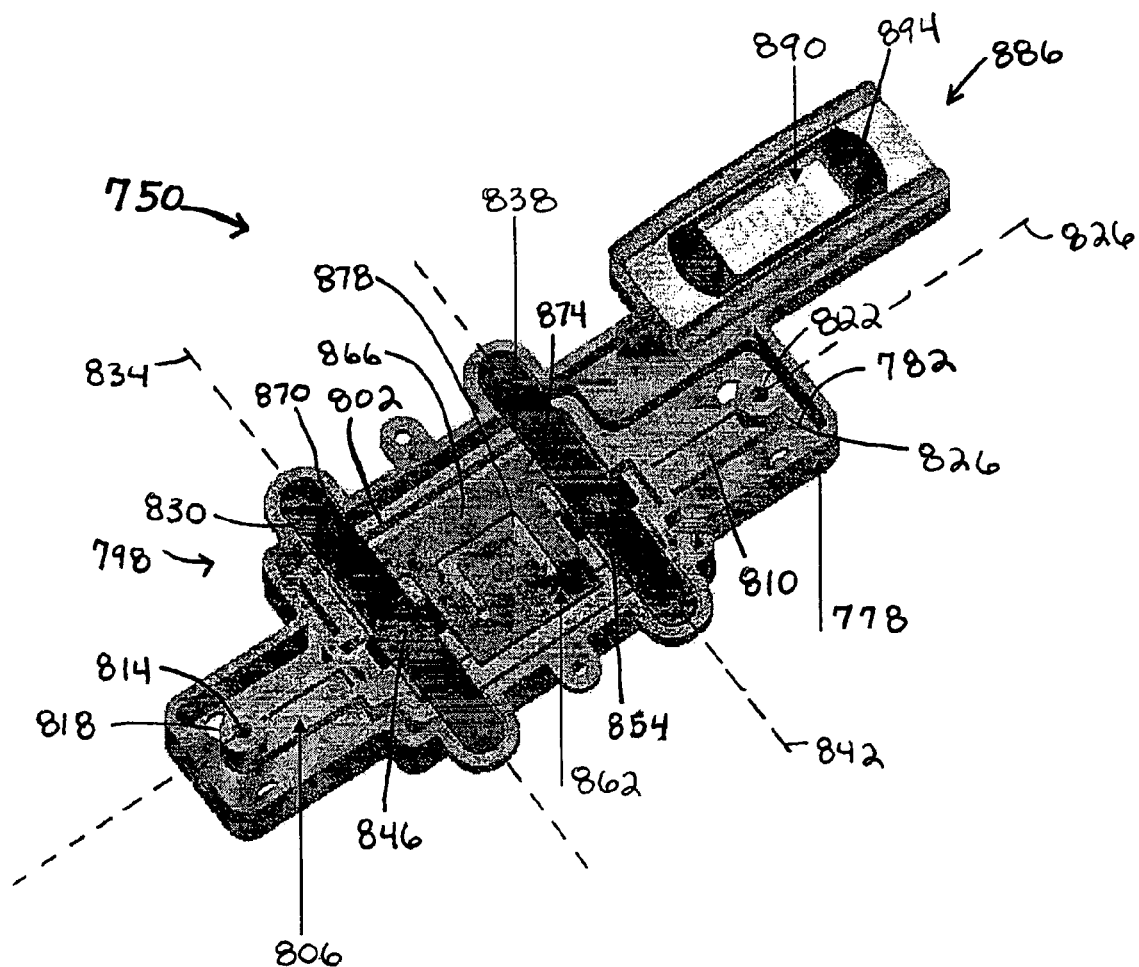
FIG. 13 is a perspective view of a weight measurement module according to one embodiment of the present invention.
Figure 14:
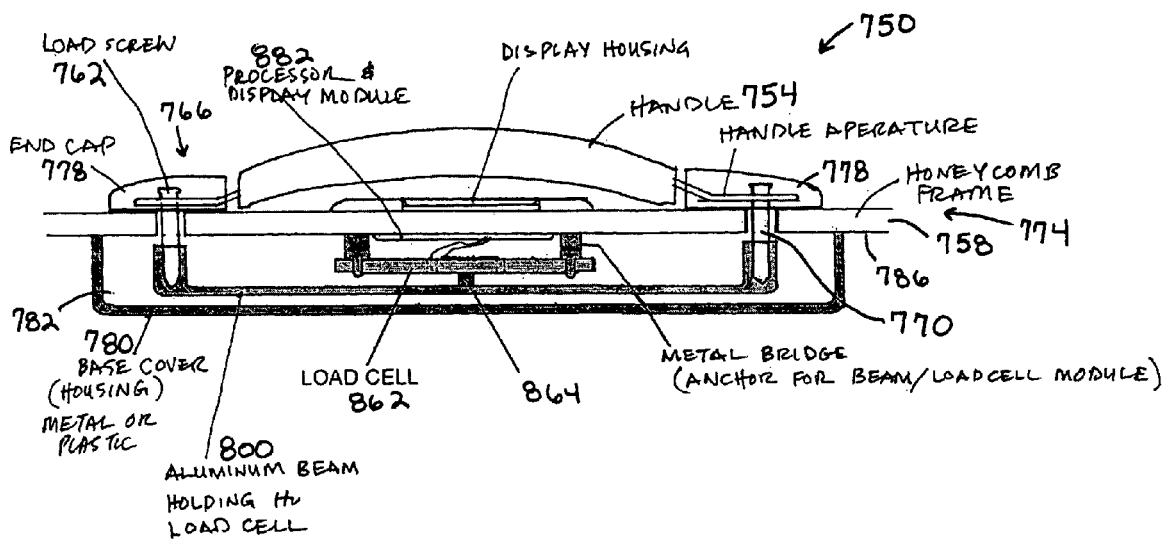
FIG. 14 is a side cross-sectional view of the weight measurement module illustrated in FIG. 13.
Figure 15A:
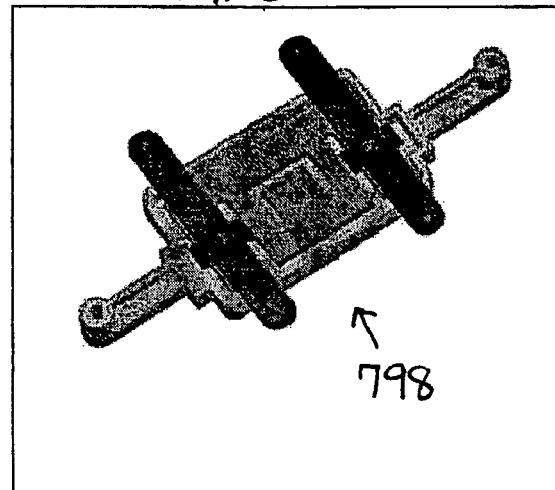
FIG. 15A is a perspective view of an assembly of the weight measurement module illustrated in FIG. 13.
Figure 15B:
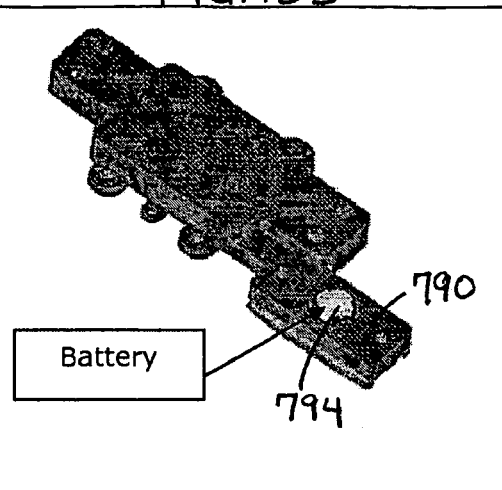
FIG. 15B is a bottom perspective view of the weight measurement module illustrated in FIG. 13.
Figure 15C:
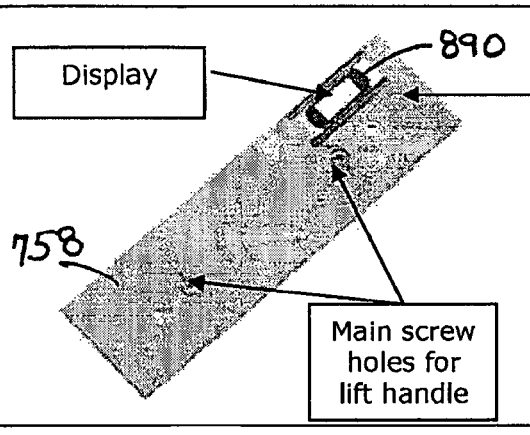
FIG. 15C is a top perspective view of a portion of a piece of luggage incorporating the weight measurement module illustrated in FIG. 13.
Figure 15D:
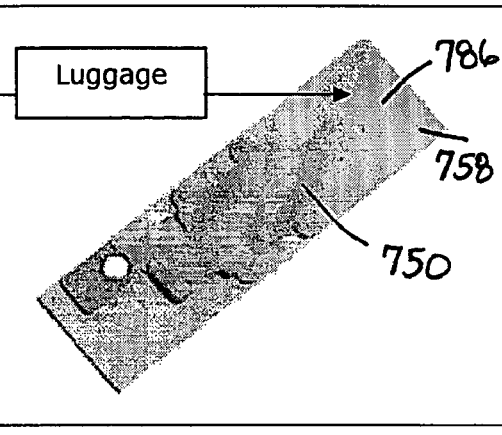
FIG. 15D is a bottom perspective view of a portion of a piece of luggage incorporating the weight measurement module illustrated in FIG. 13.

FIGS. 13-15 illustrate another embodiment of a weight measurement module 750 operable to provide an indication of weight of a piece of luggage. The piece of luggage includes the weight measurement module 750 and a handle 754 coupled to the weight measurement module 750. The handle 754 is generally comprised of flexible material. The handle 754 is coupled to the weight measurement module 750 through a wall 758 of the luggage with a first fastener 762 near a first end 766 of the handle 754 and a second fastener 770 positioned near a second end 774 of the handle 754. The handle 754 includes a plurality of end caps 778, one each generally positioned at the first end 766 of the handle 754 and the second end 774 of the handle 754 to substantially cover the corresponding fasteners 762, 770.

The weight measurement module 750 includes a housing 780 defining a cavity 782 and adapted to be secured to an inside surface 786 of the wall 758 by a plurality of fasteners, such as screws. The housing 780 includes a compartment 790 adapted to support a power source 794, such as one or more batteries (e.g., lithium, alkaline, etc.). The compartment 790 may be enclosed with a cover adapted to provide access to the power source 794.

The weight measurement module 750 also includes a load cell assembly 798 positioned within the cavity 782. The load cell assembly 798 does not contact the housing 780. The load cell assembly 798 includes a housing 800 having a body 802 and a first arm 806 extending from the body 802 and a second arm 810 extending from the body 802. The first arm 806 includes a first aperture 814 positioned near a distal end 818 of the first arm 806. The second arm 810 includes a second aperture 822 positioned near a distal end 826 of the second arm 810. The first aperture 814 is adapted to receive the first fastener 762, and the second aperture 822 is adapted to receive the second fastener 770, thereby connecting the handle 754 to the assembly 798 through the wall 758.

The load cell assembly 798 generally defines a length having an axis 826 extending between the first aperture 814 and the second aperture 822. The load cell assembly 798 includes a first member 830 supported by the body 802 and generally defining a length having an axis 834 oriented substantially perpendicular to the axis 826. The load cell assembly 798 also includes a second member 838 supported by the body 802 and generally defining a length having an axis 842 oriented substantially perpendicular to the axis 826. The axis 842 of the second member 838 is spaced a predetermined distance from the axis 834 of the first member 830 and oriented substantially parallel to the axis 834 of the first member 830. The first member 830 includes a first aperture 846 adapted to receive a fastener 850, such as an anchor screw, and the second member 838 includes a second aperture 854 adapted to receive a fastener 858, such as an anchor screw. The fasteners 850, 858 are connected to the wall 758 and provide support for the first member 830 and the second member 838.

The load cell assembly 798 also includes a load cell 862 positioned in the body 802 and supported by the first member 830 and the second member 838. The load cell 862 is spaced from the load cell assembly housing 800 by a fastener 864 or support post. The load cell 862 includes a body 866, a first arm 870 extending from the body 866, and a second arm 874 extending from the body 866. The first arm 870 is coupled to the first member 830, and the second arm 874 is coupled to the second member 838. The body 866 includes an aperture 878 generally defining a squared "U" shape with a strain gage positioned inside the "U".

The weight measurement module 750 also includes a processor 882 operable to receive load cell data, process the data, compensate the data, and output data indicative of weight. The weight measurement module 750 also includes a display module 886 including a display 890 (e.g., a LCD) operable to receive data from the processor 882 and display a numerical value. The display module 886 also includes a switch 894 (e.g., ON/OFF pushbutton) operable to activate the weight measurement module 750. The display module 886 may include additional switches or buttons for various functional features. The display 890 at least partially extend through the wall 758.

In operation, the user grips the handle 754 of the luggage and lifts the luggage off of the ground. The combined weight of the luggage and the items supported by the luggage is then substantially supported by the weight measurement module 750. More specifically, as the luggage exerts a force on the handle 754 and the load cell assembly 798, the load cell housing 800 moves upward, which causes the fastener 864 to move upward, thus exerting a force on the load cell 862, while the first support member 830 and the second support member 838 remain in contact with the wall 758. The force on the load cell 862 causes the strain gage on the load cell 862 to change its resistance proportional to the applied load and generates a voltage proportional to the applied load. The processor 882 receives the voltage signal generated by the load cell 862 and processes (e.g., amplify, condition, combine, compensate, and convert) the voltage signal to a digital signal indicative of the weight of the luggage and its contents. The display 890 presents the digital signal in the form of a numerical value representative of the weight of the luggage and its contents to the user. The weight is displayed for a few seconds while the luggage is off the ground and on the ground.

Various features and advantages of the invention are set forth in the following claims.

What is claimed is:

1. A bag comprising:
    a plurality of side walls, a top wall connected to each of the side walls, a bottom wall connected to each of the side walls, the plurality of side walls, the top wall, and the bottom wall defining an enclosure;
    a handle coupled to the top wall; and
    a weight measurement module coupled to the handle through the top wall, the weight measurement module including
    a housing coupled to an interior surface of the top wall,
    a power source supported by the housing,
    a processor supported by the housing,
    a first load cell and a second load cell each electrically connected to the processor and mechanically coupled to the handle and the housing with a fastener, and
    a display coupled to the housing and an exterior surface of the top wall, the processor operable to process data received from the first load cell and the second load cell and transmit data to the display indicative of weight of the bag, and
    wherein the first load cell and the second load cell include a common beam, and wherein the beam substantially extends the length of the housing.

2. The bag of claim 1 wherein the processor processes the data from the first load cell and the data from the second load cell to generate a digital signal indicative of weight of the bag.

3. The bag of claim 1 wherein the housing is substantially T-shaped.

4. The bag of claim 1 further comprising a switch electrically connected to the processor and extending through the top wall and operable to activate the processor.

5. The bag of claim 1 further comprising a switch electrically connected to the processor and extending through the top wall and operable to change the display of units of measure of the weight.

6. The bag of claim 1 wherein a first end of the beam is connected to a first end of the handle and a second end of the beam is connected to a second end of the handle.

7. The bag of claim 1 wherein the display presents a numerical value indicative of the weight of the bag.

8. The bag of claim 1 wherein the power source includes a plurality of batteries.

9. The bag of claim 1 wherein the housing comprises aluminum.

10. A bag comprising:
    a plurality of side walls, a top wall connected to each of the side walls, a bottom wall connected to each of the side walls, the plurality of side walls, the top wall, and the bottom wall defining an enclosure;
    a plurality of wheels coupled to the bottom wall;
    a retractable handle coupled to one of the side walls, the top wall, and the bottom wall;
    a handle coupled to the top wall, the handle including a first end and a second end; and
    a weight measurement module coupled to an inside surface of the top wall, the weight measurement module including
    a housing having a first end and a second end, the first end of the housing coupled to the first end of the handle, the second end of the housing coupled to the second end of the handle,
    a beam having a first end and a second end, the first end of the beam coupled to the first end of the handle and the first end of the housing, the second end of the beam coupled to the second end of the handle and the second end of the housing, a first strain gage connected to the beam near the first end of the beam defining a first load cell, and a second strain gage connected to the beam near the second end of the beam defining a second load cell,
    a processor electrically connected to the first load cell and the second load cell, the processor operable to receive data from the first load cell and the second load cell and generate a digital signal representative of the weight of the bag and items positioned in the enclosure based on the data received from the first load cell and the second load cell,
    a display electrically connected to the processor, the display operable to present a numerical value based on the digital signal, and
    a switch electrically connected to the processor, the switch operable to activate the processor to generate the digital signal when the bag is elevated from the ground.

11. The bag of claim 10 wherein the display is coupled to the housing and the top surface and is positioned adjacent to the handle.

12. The bag of claim 10 wherein the first end of the beam includes a first aperture and the second end of the beam includes a second aperture, the first and second apertures adapted to receive a fastener to connect the beam to the handle and the housing.

13. The bag of claim 10 further comprising a switch electrically connected to the processor and extending through the top wall and operable to change the display of units of measure of the weight.

14. The bag of claim 10 wherein the weight measurement module includes a power source supported by the housing.

15. The bag of claim 14 wherein the power source includes a plurality of batteries.

16. The bag of claim 14 wherein the housing includes a compartment adapted to support the power source, and wherein the housing includes a cover adapted to enclose the compartment.

* * * * *